United States Patent [19]
Yanagisawa

[11] Patent Number: 6,078,109
[45] Date of Patent: Jun. 20, 2000

[54] POWER SUPPLY SYSTEM FOR AN ELECTRIC/ELECTRONIC APPARATUS

[75] Inventor: Takashi Yanagisawa, Yokohama, Japan

[73] Assignee: International Business Machines Corporation, Armonk, N.Y.

[21] Appl. No.: 09/145,517

[22] Filed: Sep. 2, 1998

[30] Foreign Application Priority Data

Sep. 4, 1997 [JP] Japan ................................. 9-240004

[51] Int. Cl.$^7$ ........................................................ H02J 3/06
[52] U.S. Cl. ................................. 307/18; 307/64; 307/29
[58] Field of Search ................................. 307/18, 64, 80, 307/85, 86, 87, 29, 23

[56] References Cited

U.S. PATENT DOCUMENTS 4,779,007  10/1988  Schlanger et al. ........................ 307/66

Primary Examiner—Fritz Fleming
Assistant Examiner—Robert L. DeBeradinis
Attorney, Agent, or Firm—Bernard D. Bogdon

[57] ABSTRACT

A power supply system for an electric/electronic apparatus, such as a notebook computer and an expansion unit, which can be separated into a plurality of subunits or combined into one unit. When a DC power of an external power supply is applied to only an DC inlet A, a FET switch is turned off, so that the DC power at the DC inlet A is applied to both the DC/DC converters A and B. When the DC power of the external power supply is applied to both the DC inlets A and B, the FET switch is turned ON, so that the DC power at the DC inlet A is applied to the DC/DC converters A and the DC power at the DC inlet B is applied to the DC/DC converter B. The user can attach the AC adapter to only the DC inlet A or to both the DC inlets A and B to meet the system configuration, i.e., according to what kind of apparatus(es) is connected into the open slot(s).

4 Claims, 3 Drawing Sheets

POWER SUPPLY SYSTEM FOR AN ELECTRIC/ELECTRONIC APPARATUS

FIELD OF THE INVENTION

The present invention relates to a power supply system to an electric/electronic apparatus. More particularly, the present invention relates to a power supply system to an electric/electronic apparatus, such as a notebook computer and its expansion units, which can be separated into a plurality of subunits or combined into one unit. More particularly, the present invention relates to a power supply system which is capable of switching a path for supplying the power to meet a current requirement of a system of the notebook computer and the expansion units.

BACKGROUND OF THE INVENTION

Various personal computers, such as, but not limited to, a desktop type, a tower type and a notebook type personal computer, have been developed and marketed with a recent advance of technology. Among them, the notebook computer is a battery driven type personal computer designed to provide a portability feature.

The notebook computer does not generally contain extra space for mounting a peripheral apparatus, since a compact size and light weight features are important. In some cases, the expansion of devices cannot be realized by a PC card. Also, the number of bus slots is remarkably limited since the available surface area is small. Desktop computers are usually provided with more than 10 bus slots, while most of the laptop/notebook type computers are not provided with bus slot capability, and only some are provided with one or two bus slot(s). The notebook computer is characterized in that it is easily carried, and accordingly it is troublesome to connect various cables, such as a printer cable, a monitor cable, a communication cable, etc., to the notebook computer when the notebook computer is used in an office, and to disconnect the cables when the notebook computer is carried. This aspect causes usability to be decreased.

The expansion unit provides the notebook computer with the same working environment as that of the desktop computer without affecting the portability when the notebook computer is used in the office. The main functions of a docking station include a port replication function and a bus expansion function.

The port replication function is realized by an expansion unit which is provided with a plurality of extended lines of the port signals of the notebook computer. If a printer, a CRT display, an external keyboard, etc. are connected to each of the ports of the expansion unit in advance, the user can immediately use the printer, the CRT display, the external keyboard by placing the notebook computer onto the expansion unit. If the connection of the these external equipments to the expansion unit is maintained, these external equipments can be immediately used by another user connecting their notebook computer to the expansion unit, whereby each user is released from the troubles and work of connecting or disconnecting the various cables. It is sometimes referred to as a cable management function since the management of the connection of the cables is necessarily accomplished at one time.

The bus expansion function is realized by providing the expansion unit with the extended portions of the bus of the notebook computer, such as a PCI (Peripheral Component Interface) bus as a local bus, and an ISA (Industry Standard Architecture) bus as a system bus. The expansion unit has a space (media bay) for receiving an external memory device connected to the bus, and bus slots for mounting adapter cards. It is possible to provide the notebook computer with a file subsystem or a network subsystem by connecting a hard disk drive (HDD), a SCSI (Small Computer System Interface) card, and a LAN adapter to the expansion unit in advance.

Sometime, the expansion unit is referred to as the docking station. Also, the expansion unit having only the port replication function is referred to as a port replicator. The expansion unit itself is disclosed in a Japanese patent application specification H05-181593 and U.S. Pat. No. 5,555,487.

The supply of power to the electric/electronic apparatus is usually made by converting an AC voltage of a commercial power source to a DC voltage by an AC adapter, and distributing the DC voltage to each section of the apparatus after converting and stabilizing the DC voltage by a DC/DC converter.

In the case of the above described notebook computer, the DC/DC converter is built into the computer, and the AC adapter is located outside of the computer. The cost, size and weight of the power supply circuit, such as the AC adapter and the DC/DC converter, tend to increase in order to meet a required power capacity. Accordingly, the power capacity of this power supply circuit is designed to meet a power requirement in an actual use environment.

The power supply system used in the case to which the notebook computer is mounted to the expansion unit is classified as a first system in which the DC power from the AC adapter mounted on the computer side is commonly used by the computer and the expansion unit, and as a second system in which the DC power from the AC adapter mounted on the expansion unit side is commonly used by the computer and the expansion unit. If the expansion unit is of the port replicator type, the power consumption of the expansion unit side is relatively small since the expansion unit contains only the low power consumption type apparatus, such as the external keyboard/mouse, and the self powered apparatus, such as the CRT display, the printer, etc., which is provided with their power supply circuit.

Accordingly, for the first system, the system can be used in which the DC power of the standard power capacity generated by the AC adapter mounted in the notebook computer is supplied to all the components. If the expansion unit is of the docking station type, the power consumption of the expansion unit side becomes large as a result of the fact that many peripheral equipments are connected to the expansion unit. In this case, since it is expected that the remarkably large power consumption exceeds the power consumption in the actual use environment of the notebook computer, it is considered preferable to use the second type of system in which the power supply is prepared in the expansion unit side rather than to increase the power capacity of the standard AC adapter designed to be used in the actual use environment of the notebook computer.

The computer system is provided with so called open slots, such as the bus slots and the PC card slots into which a card with various power capacity is inserted. Although the electric and mechanical specifications of the adapter card inserted into the bus slot and the PC card inserted into the PC card slot are defined, the power capacity of the cards are not defined in most cases. For example, an Ethernet card, a wireless LAN card, the HDD, a PC card for ZV port, etc., are driven by a relatively large current. In the case that the apparatuses requiring the large current are simultaneously connected to the open slots of each of the computer and the expansion unit, the remarkably large power capacity exceeds the power capacity in the actual use environment of the notebook computer defined by a manufacturer for the design and the fabrication required.

An approach made as a relatively simple method for resolving the shortage of the power capacity, is one in which the AC adapter and the DC/DC converter are designed and fabricated to have a certain margin. However, recently notebook computers have been equipped with the external memory devices, such as the HDD, CD-ROM drive (or DVD drive), FDD, so that the power requirement of the notebook computer in their actual use environment has been increased. For example, a notebook computer equipped with the AC adapter of the power capacity exceeding 50 W has been marketed. Accordingly, the cases in which the problem is not solved by the simple approach of increasing the power capacity of the power supply circuit have been increased. Attaching the large capacity power supply circuit to the notebook computer as the standard option for an environment in which the connection of the apparatus requiring the large power is expected, causes a disadvantage in view of the product costs. The portability of the notebook computer is also sacrificed since the size of the power supply circuit becomes large.

In this related environment, ZV (Zoom Video) is a standard having a connecting compatibility with the PC card. The PC card for the ZV port realizes a high speed display of motion picture by performing a direct transfer of the data to and from a video controller.

SUMMARY OF THE INVENTION

An object of the present invention is to provide an improved power supply system for the electric/electronic apparatus, such as the notebook computer and the expansion unit, which can be separated into a plurality of subunits or combined into one unit. A further object of the present invention is to provide an improved power supply system for selectively switching a path for supplying the power to meet a current requirement by a system of the notebook computer and the expansion unit.

The present invention is made to solve the above stated deficiencies. A first aspect of the present invention is a power supply system for an electric/electronic apparatus which includes a first inlet for inputting a power of an external power supply; a second inlet for inputting a power of an external power supply; a first power load for consuming a power; a second power load for consuming a power; a first power line for supplying the power inputted by the first inlet to the first load; a second power line for supplying the power inputted by the second inlet to the second load; a third power line for supplying the power inputted by the first inlet to the second load; and a cutoff arrangement for responding to an input of the power to the second inlet to cutoff the third power line.

A second aspect of the present invention is a power supply system for supplying a power to each of a first electric/electronic apparatus and a second electric/electronic apparatus connected to the first electric/electronic apparatus through a connector, which includes, a first inlet provided in the first electric/electronic apparatus; a second inlet provided in the second electric/electronic apparatus; a first power load provided in the first electric/electronic apparatus; a second power load provided in the second electric/electronic apparatus; a first power line for supplying a power inputted by the first inlet to the first power load; a second power line for supplying a power inputted by the second inlet to the second power load; a third power line for supplying the power inputted by the first inlet to the second power load; and a cutoff means for responding to an input of the power to the second inlet to cutoff the third power line.

A third aspect of the present invention is a power supply system for supplying a power to each of a first electric/electronic apparatus and a second electric/electronic apparatus connected to the first electric/electronic apparatus through a connector, which includes, a first DC inlet, to which an AC adapter is connectable, provided in the first electric/electronic apparatus; a second DC inlet, to which an AC adapter is connectable, provided in the second electric/electronic apparatus; a first DC/DC converter provided in the first electric/electronic apparatus; a second DC/DC converter provided in the second electric/electronic apparatus; a first power line for supplying a DC power inputted by the first DC inlet to the first DC/DC converter; a second power line for supplying a DC power inputted by the second DC inlet to the second DC/DC converter; a third power line for supplying the DC power inputted by the first DC inlet to the second DC/DC converter; and a cutoff means for responding to a connection of the AC adapter to the second DC inlet to cutoff the third power line.

DETAILED DESCRIPTION OF THE PREFERRED EMBODIMENTS

Figure 1:
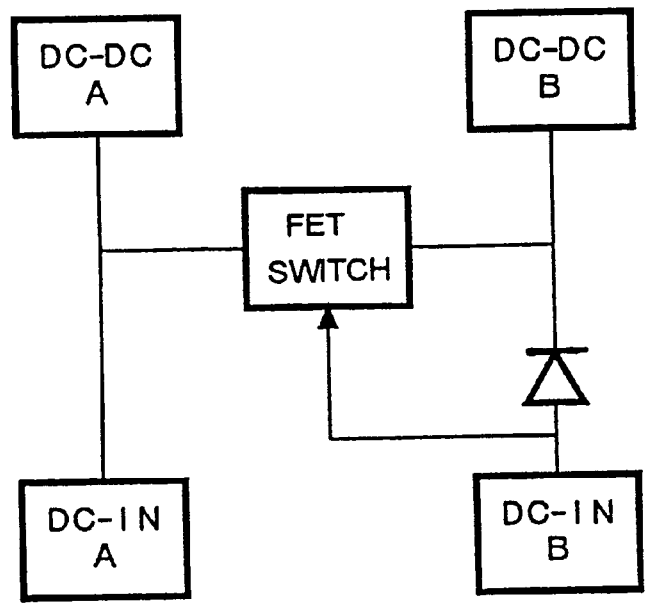
FIG. 1 shows a basic concept in block diagram form of the power supply system according to the principles of the present invention.

A description of symbols used in FIGS. 1–4 is as follows: DC computer inlet 11; DC/DC computer converter 12; computer load 13; first AC adapter 16; DC expansion unit inlet 21;

DC/DC expansion unit converter 22; expansion unit load 23; diode 24; FET switch 25; second AC adapter 26; notebook computer 100; computer docking connector 150; expansion unit 200; and expansion unit docking connector 250.

The operation of the present invention is described herein with reference to the following FIGS. 1–4 where FIG. 1 shows a basic concept of the power supply system of the present invention. The system comprises two sets of a DC/DC converter and a DC inlet. It is assumed for example that the DC/DC converter A and the DC inlet A are located on the notebook computer, and the DC/DC converter B and the DC inlet B are located on the expansion unit. An external AC adapter, shown in FIG. 4, which is the standard attachment to the notebook computer is inserted or connected to the DC inlet A, and the DC power of the external power supply with the power capacity which meets the power requirement in the actual use environment of the notebook computer is supplied through the AC adapter.

The DC inlet A constitutes a first inlet of the first aspect of the present invention. Also, an external AC adapter, shown in FIG. 4, which is the standard attachment to the expansion unit is inserted in the DC inlet B. The DC inlet B constitutes a second inlet of the first aspect of the present invention. When the apparatuses are inserted into the open slots of the notebook computer and the expansion unit, for example, so that a total power consumption of the entire system exceeds a predetermined power capacity, the user decides to insert or connect the AC adapters to both the DC inlet A and DC inlet B.

The DC/DC converter A is supplied with the DC power of the external power supply inputted to the DC inlet A. The power supply voltage generated by the DC/DC converter A is distributed to each component in the notebook computer and consumed by the components. The DC/DC converter A and these power consumption components constitute a first power load of the first aspect of the present invention.

The DC/DC converter B is supplied with the DC power of the external power supply inputted to the DC inlet A through a FET switch or the DC power of the external power supply inputted to the DC inlet B. The power supply voltage generated by the DC/DC converter B is distributed to each component in the expansion unit and consumed by the components. The DC/DC converter B and these power consumption components constitute a second power load of the first aspect of the present invention. The FET switch responds to the existence of the external DC input (or the connection of the AC adapter) at the DC inlet B, to open the FET switch to cutoff the supply of the power source voltage from the DC inlet A to the DC/DC converter B. The FET switch constitutes a cutoff device in the first aspect of the present invention.

A diode connected at the output of the DC inlet B is provided to prevent both the output voltages of the AC adapters inserted in each of the DC inlets A and B from conflicting with each other.

Figure 2:
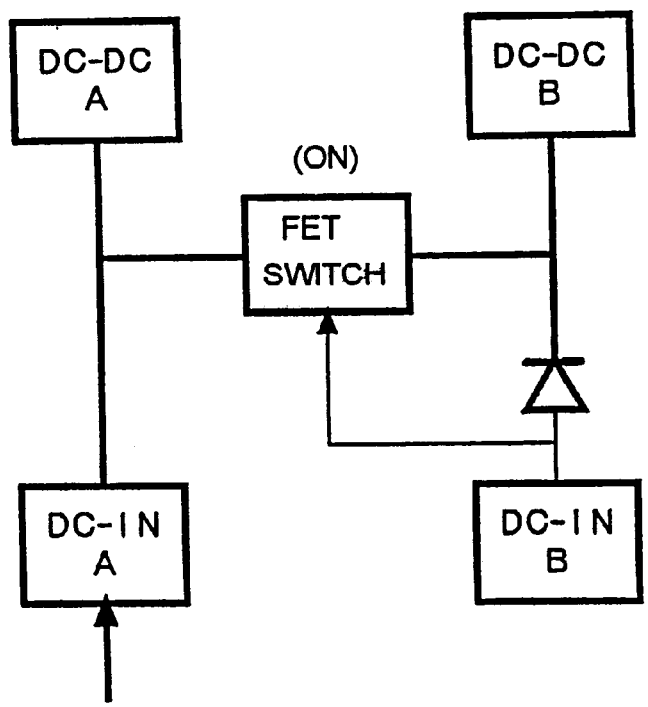
FIG. 2 shows the operational characteristic of the power supply system of FIG. 1 when the external DC input exists at only the DC inlet A of FIG. 1.

FIG. 2 shows the operational characteristic of the power supply system when the external DC input exists at only the DC inlet A. In this case, the FET switch maintains its turn ON condition, so that the power supplied to the DC inlet A is supplied to both the DC/DC converters A and B.

Figure 3:
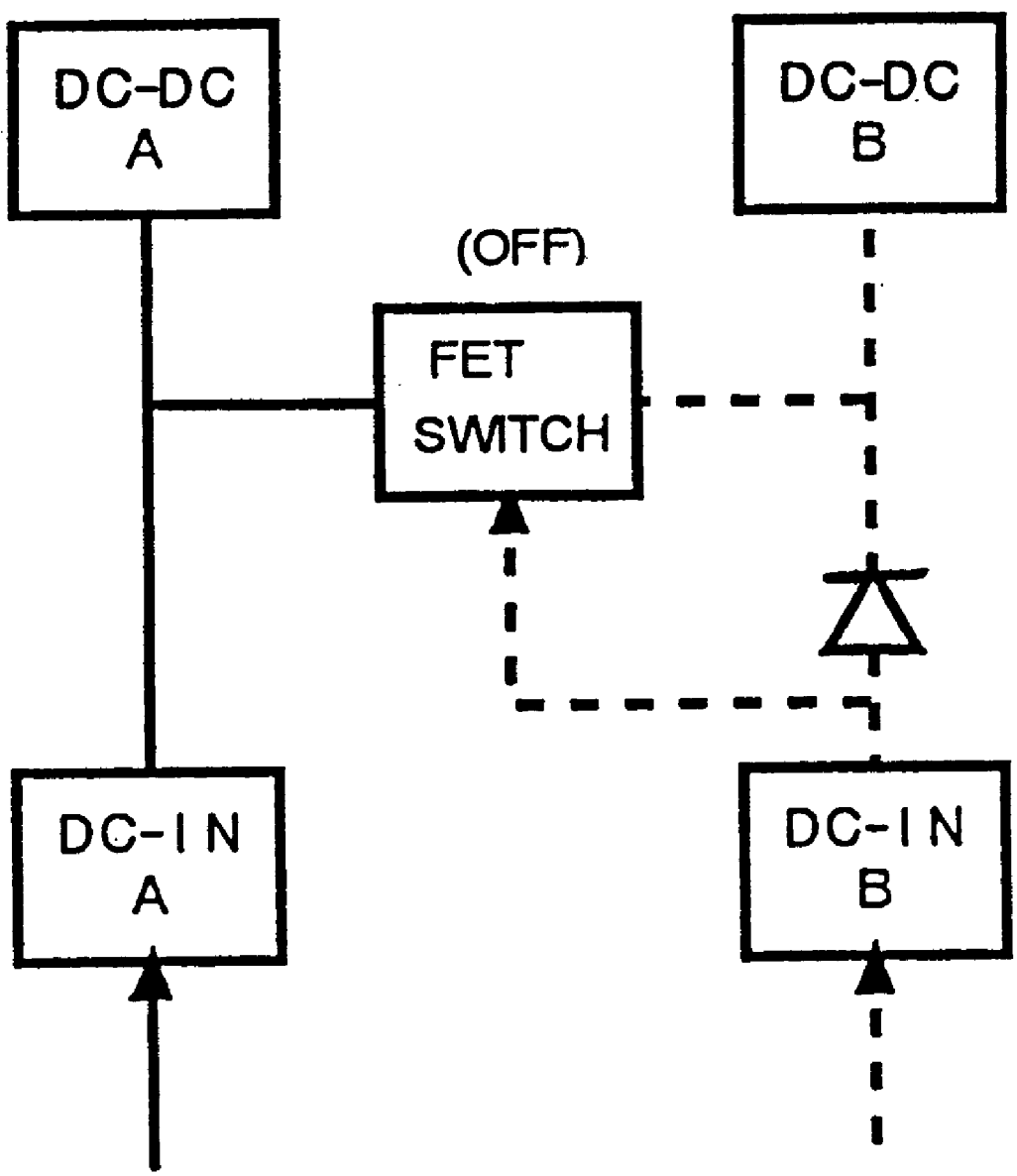
FIG. 3 shows the operational characteristic of the power supply system of FIG. 1 when the external DC input exists at both the DC inlets A and B of FIG. 1.

The FIG. 3 shows the operational characteristic of the power supply system when the external DC input exists at both the DC inlets A and B. In this case, the FET switch is turned OFF, so that the DC power of the external power supply supplied to the DC inlet A is supplied to the DC/DC converter A and the DC power of the external power supply supplied to the DC inlet B is supplied to the DC/DC converters B.

The user can merely attach the AC adapter to only the DC inlets A, or to both the DC inlets A and B to meet the system configuration i.e. which is a factor of what kind of apparatus (es) is connected into the open slot(s). The power supplied from each of the AC adapters is suitably distributed within the system. It should be understood that the path for supplying the power is switched to meet the required power in the system configuration, in accordance with the power supply system of the present invention.

Figure 4:
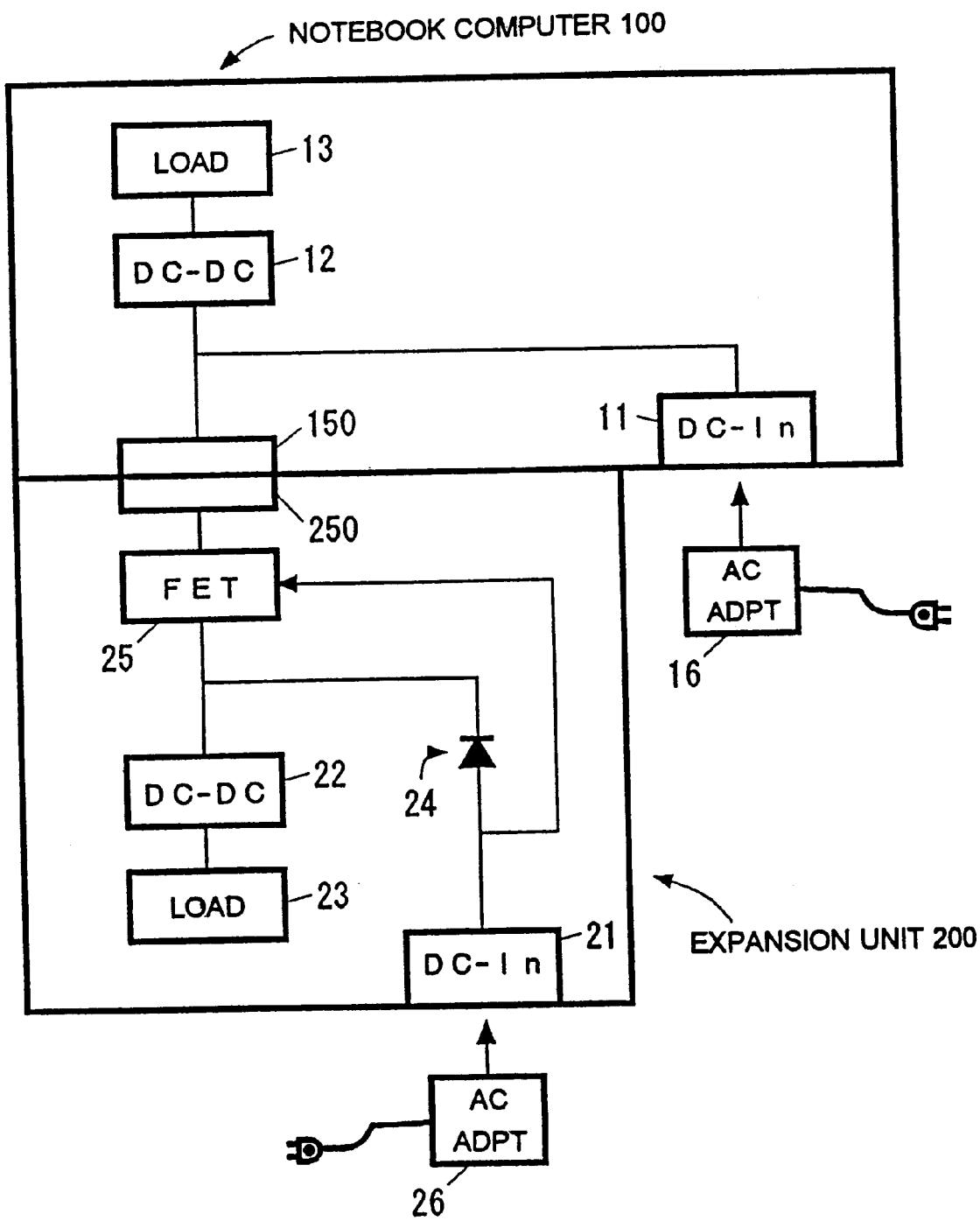
FIG. 4 shows the example in which the power supply system of the present invention is incorporated in a notebook computer and an expansion unit.

Another positive characteristic and merit of the present invention will become apparent by the following detail description of the embodiment made by referring to the drawing of FIG. 4. FIG. 4 shows the example in which the power supply system of the present invention is incorporated in the notebook computer 100 and the expansion unit 200.

The notebook computer 100 comprises the DC inlet 11 for supplying the DC power of the external power supply, the DC/DC converter 12, the load 13 consuming the power, and a docking connector 150 for electrically connecting to the expansion unit 200. An example of the notebook computer 100 is IBM ThinkPad 760/765 computer ("IBM" and "ThinkPad" are trademarks of International Business Machines Corporation).

The notebook computer 100 can be driven by an internal or built in type battery (not shown), and also driven by the DC power of the external power supply supplied by connecting or inserting the AC adapter 16 to the DC inlet 11. The voltage level of the DC voltage of the external power supply is converted by the DC/DC converter 12, and the converted DC voltage is supplied to the load 13 in the notebook computer 100. The converted DC voltage can also be supplied to the expansion unit 200 through the docking connector 150.

The power is consumed by the load 13. The load 13 includes various components, such as a CPU chip, a memory chip, a peripheral controller chip, mounted on a mother card, the external memory devices, such as the HDD, CD-ROM drive, and a liquid display device (LCD).

The docking connector 150 is mounted on a back surface, for example, of the notebook computer 100. The electrical and mechanical characteristic of the docking connector 150 is so adapted to that of the docking connector 250 of the expansion unit 200 as to connect both the connectors 150 and 250 each other. The exchange of the signals of the busses and the ports and the supply of the DC power are made between the notebook computer 100 and the expansion unit 200 through the connectors 150 and 250.

The expansion unit 200 comprises the DC inlet 21 for supplying the DC power of the external power supply, the DC/DC converter 22, the load 23 consuming the power, and the docking connector 250 for electrically connecting to the notebook computer 100.

The power is consumed by the load 23. The load 23 includes the external memory device and the adapter card, etc., for example, mounted to the expansion unit 200. However, the load 23 does not include the self powered type apparatuses, such as the CRT display and the printer. In other words, the expansion unit 200 is a device for connecting the peripheral apparatuses, and its power consumption remarkably changes depending upon the types of and the number of added peripheral apparatuses. For example, when the HDD, the Ethernet card and the wireless LAN card, etc., are added, the total power consumption within the expansion unit 200 markedly increases.

The expansion unit 200 is supplied with the DC power from the notebook computer 100, and is also supplied with the DC power of the external power supply from the AC adapter inserted or connected to its own DC inlet 21. When the total power consumption within the expansion unit 200 is increased due to the change of their system configuration, the user merely decides to insert or connect the AC adapter to the DC inlet 21. The voltage level of the DC voltage of the external power supply supplied from the DC inlet 21 is converted by the DC/DC converter 22, and the converted voltage is supplied to the load 23 in the expansion unit 200.

The FET switch 25 for exclusively receiving the DC voltage is provided on a power line for supplying the DC voltage from the notebook computer 100 to the DC/DC converter 22. The turn on/off of the FET 25 is controlled by the DC voltage of the external power supply applied through the DC inlet 21. During the period that the DC voltage of the external power supply is not applied to the DC inlet 21, the FET switch 25 is turned on, so that the DC voltage from the notebook computer 100 is passed to the DC/DC converter 22. When the DC voltage of the external power supply is applied to the DC inlet 21, the DC voltage is applied to a gate electrode of the FET switch 25 to turn the FET switch 25 off, so that the supply of the DC voltage from the notebook computer 100 is stopped, and only the DC voltage of the external power supply through the DC inlet 21 is supplied to the DC/DC converter 22.

The diode 24 is connected to the DC inlet 21 in a forward direction. The diode 24 is provided to prevent both the DC voltages from the AC adapters 16 and 26 connected in each of the DC inlets 11 and 21 from conflicting with each other.

The FET switch 25 is replaceable by another switch which can cut off the power. The FET switch is provided in the expansion unit side in the embodiment of the present invention, it can likewise be provided on the notebook computer side. It is not necessary to use the two electric/electronic apparatuses which can be separated into a plurality of sub-units or combined into one unit. The power supply scheme of the present invention can be applicable to the system constituted by a single apparatus or more than three apparatuses.

As described before, the present invention can provide the excellent power supply system for the electric/electronic apparatus, such as the notebook computer and the expansion unit, which can be separated into a plurality of sub-units or combined into one unit. Also, the present invention can provide the excellent power supply system for selectively switching the path for supplying the power to meet a current required by the system of the notebook computer and the expansion unit.

Although a specific embodiment of the invention has been disclosed, it will be understood by those having skill in the art that changes in that specific embodiment can be made without departing from the spirit and the scope of the invention. The present invention is described by using the exemplary embodiment, and should not be construed limitedly. The claims should be referred to determine the concept of the present invention.

What is claimed:

1. A power supply control system for an electronic apparatus comprising:
   a first inlet for inputting electrical power from a first external power supply;
   a second inlet for inputting electrical power from a second external power supply;
   a first power load for consuming electrical power from the first external power supply;
   a second power load for consuming electrical power from either the first or the second external power supply;
   a first power line for supplying the electrical power inputted by the first inlet to the first load;
   a second power line for supplying the electrical power inputted by the second inlet to the second load;
   a third power line for supplying the electrical power inputted by the first inlet to the second load; and
   a cutoff device for responding to an input of the electrical power to the second inlet to automatically cut off the electrical power from the third power line.

2. A power supply control system for supplying electrical power to each of a first electrical apparatus and a second electrical apparatus connected to the first electrical apparatus through a connector, comprising:
   a first inlet provided in the first electrical apparatus for connection to a first power source;
   a second inlet provided in the second electrical apparatus for connection to a second power source;
   a first power load provided in the first electrical apparatus;
   a second power load provided in the second electrical apparatus;
   a first power line for supplying electrical power inputted by the first power source through the first inlet to the first power load;
   a second power line for supplying electrical power inputted by the second power source through the second inlet to the second power load;
   a third power line for supplying the electrical power inputted through the first inlet to the second power load; and
   a cutoff apparatus for automatically responding to an input of power from the second power source to the second inlet to automatically cut off the supplying of the electrical power from third power line.

3. A power supply control system for supplying electrical power to each of a first electrical apparatus and a second electrical apparatus connected to the first electrical apparatus through a connector, comprising:
   a first DC power inlet, to which a first AC power adapter is connectable, provided in the first electrical apparatus;
   a second DC power inlet, to which a second AC power adapter is connectable, provided in the second electrical apparatus;
   a first DC/DC power converter provided in the first electrical apparatus;
   a second DC/DC power converter provided in the second electrical apparatus;
   a first power line for supplying DC electrical power inputted at the first DC inlet to the first DC/DC converter;
   a second power line for supplying a DC electrical power inputted at the second DC inlet to the second DC/DC converter;
   a third power line for supplying the DC electrical power inputted at the first DC inlet to the second DC/DC converter; and
   a control device for responding to a connection of the AC power adapter at the second DC inlet to automatically cut off the DC electrical power from the third power line.

4. A power supply control system for supplying electrical power to each of a first electrical apparatus and a second electrical apparatus connected to the first electrical apparatus through a connector, comprising:
   a first inlet provided in the first electrical apparatus for connection to a first power source;
   a second inlet provided in the second electrical apparatus for connection to a second power source;
   a first power load provided in the first electrical apparatus;
   a second power load provided in the second electrical apparatus;
   a first power line for supplying electrical power inputted by the first power source through the first inlet to the first power load;
   a second power line for supplying electrical power inputted by the second power source through the second inlet to the second power load;
   a third power line for supplying the electrical power inputted through the first inlet to the second power load; and
   a selective path switching apparatus for automatically providing a power path through the third power line to the second power load for responding to a current requirement of either the first electrical apparatus or the second electrical apparatus to input power from either of the first power source connected to the first inlet or the second power source connected to the second inlet to automatically switch power paths and to provide electrical power from the second power line and the third power line.

* * * * *